US012800344B2

(12) United States Patent
Pullagurla et al.

(10) Patent No.: US 12,800,344 B2
(45) Date of Patent: Nov. 17, 2026

(54) AUTOMATIC CORRECTION OF MAP DATA FOR AUTONOMOUS VEHICLES

(71) Applicant: TORC Robotics, Inc., Blacksburg, VA (US)

(72) Inventors: Harish Pullagurla, Blacksburg, VA (US); Ryan Chilton, Blacksburg, VA (US); Jason Harper, Blacksburg, VA (US); Jordan Stone, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 178 days.

(21) Appl. No.: 18/341,469

(22) Filed: Jun. 26, 2023

(65) Prior Publication Data

US 2024/0426632 A1 Dec. 26, 2024

(51) Int. Cl.
*G01C 21/00* (2006.01)

(52) U.S. Cl.
CPC .................................. *G01C 21/3841* (2020.08)

(58) Field of Classification Search
CPC ......................... G01C 21/3841; G01C 21/3815
See application file for complete search history.

(56) References Cited

U.S. PATENT DOCUMENTS

2021/0004363 A1* 1/2021 Bailly ..................... G06T 17/05
2021/0325207 A1* 10/2021 Lin .................... G01C 21/3896
2022/0001872 A1* 1/2022 Taieb ........................ G06T 7/70
2022/0146277 A1* 5/2022 Lambert .............. G05D 1/0231
2022/0341750 A1* 10/2022 Akbarzadeh ....... G01C 21/3841
2023/0145649 A1* 5/2023 Miksa .................... G01C 21/32
701/24

FOREIGN PATENT DOCUMENTS

KR 20220001275 A * 1/2022
WO WO-2023145738 A1 * 8/2023

OTHER PUBLICATIONS

Machine Translation of KR-20220001275-A (Year: 2022).*
Machine Translation of WO-2023145738-A1 (Year: 2023).*

* cited by examiner

*Primary Examiner* — Sahar Motazedi
(74) *Attorney, Agent, or Firm* — Armstrong Teasdale LLP

(57) ABSTRACT

Systems and methods of automatic correction of map data for autonomous vehicle navigation are disclosed. One or more servers can receive, from a first autonomous vehicle traveling on a road, a first correction to map data identifying a location in the map data; generate a modified parameter of the map data based on the first correction and a second correction identifying the location, the second correction received from a second autonomous vehicle traveling on the road; update the map data based on the modified parameter; and provide the updated map data to the first autonomous vehicle.

20 Claims, 5 Drawing Sheets

AUTOMATIC CORRECTION OF MAP DATA FOR AUTONOMOUS VEHICLES

TECHNICAL FIELD

The present disclosure relates to autonomous vehicles and, more specifically, to the automatic correction of map data for autonomous vehicle operation.

BACKGROUND

The use of autonomous vehicles has become increasingly prevalent in recent years, with the potential for numerous benefits. One challenge faced by autonomous vehicles is modeling the surroundings of the autonomous vehicle. Conventional approaches utilize static, pre-processed map data to provide semantic, geometric, and other features of maps for navigating autonomous vehicles.

However, static, pre-processed map data may be incorrect, for example, when features of a road change over time. In such circumstances, the map data that the autonomous vehicle utilizes for navigation may not match the physical characteristics of the road, introducing public safety issues, a potential to violate certain traffic regions, and an increased risk of damage to the autonomous vehicle.

SUMMARY

The systems and methods of the present disclosure may solve the problems set forth above and/or other problems in the art. The scope of the current disclosure, however, is defined by the attached claims, and not by the ability to solve any specific problem.

Disclosed herein are techniques to automatically correct map data used by autonomous vehicles for navigation based on corrections transmitted by operating autonomous vehicles. Autonomous vehicles rely on various sensors to gather data about their surroundings and use that information to navigate safely. The sensors enable the autonomous vehicle to capture data that represents the environment surrounding it, which may be utilized in connection with stored map data to navigate while responding to different road conditions.

The sensor data gathered by the autonomous vehicle to respond to real-time road conditions can be compared to map data stored at the autonomous vehicle to identify any inconsistencies between the map data and the perceived environment. If inconsistencies are identified, the autonomous vehicle can generate a correction for the inconsistency and transmit the correction to one or more remote servers. The servers can utilize the corrections transmitted from several autonomous vehicles to update high-definition map data. The updated map data can then be provided to several autonomous vehicles over the air, enabling for more precise navigation over regions where changes in road properties have occurred.

The corrections may include semantic corrections, which can represent inconsistencies with respect to non-geometric properties of the road, such as speed limit, the presence or absence of traffic signs, or the type of road being traveled. The corrections may also include geometric corrections, which correspond to inconsistencies in lane, road, or shoulder geometries defined in the map data. Geometric inconsistencies may occur when lane lanes, lane types, or lane geometries have been changed, but the corresponding change has not been made in the stored map data. The server may update the map data in a batch (e.g., large scale updates) or according to a determined priority for different corrections.

One embodiment of the present disclosure is directed to a method. The method may be performed, for example, by one or more processors coupled to non-transitory memory. The method includes receiving, from a first autonomous vehicle traveling on a road, a first correction to map data identifying a location in the map data; generating, by the one or more processors, a modified feature of the map data based on the first correction and a second correction identifying the location, the second correction received from a second autonomous vehicle traveling on the road; updating, by the one or more processors, the map data based on the modified feature; and providing, by the one or more processors, the updated map data to the first autonomous vehicle.

The first correction and the second correction may each comprise a semantic correction to the map data. The first correction and the second correction may each comprise a geometric correction to the map data. Generating the modified feature may comprise calculating an average of first data of the first correction and second data of the second correction. Generating the modified feature may be responsive to determining that a number of corrections for the location of the map data satisfies a threshold. The method may include determining that the first correction satisfies a manual review condition; and generating a notification indicating the first correction upon determining that the first correction satisfies the manual review condition.

The first correction may be generated based on an output of an artificial intelligence model executed by the first autonomous vehicle. Modifying the map data may comprise replacing a corresponding feature of the map data with the modified feature. The method may include identifying a set of modified features each corresponding to a respective location of the map data; and ranking each feature of the set of modified features based on a deviation between the feature and a corresponding feature of the map data. The method may include updating the map data based on the ranking of each feature of the set of modified features.

Another embodiment of the present disclosure is directed to a system. The system includes one or more processors coupled to non-transitory memory. The system can receive, from a first autonomous vehicle traveling on a road, a first correction to map data identifying a location in the map data; generate a modified feature of the map data based on the first correction and a second correction identifying the location, the second correction received from a second autonomous vehicle traveling on the road; update the map data based on the modified feature; and provide the updated map data to the first autonomous vehicle.

The first correction and the second correction may each comprise a semantic correction to the map data. The first correction and the second correction each comprise a geometric correction to the map data. The system may generate the modified feature by performing operations comprising calculating an average of first data of the first correction and second data of the second correction. The system may generate the modified feature responsive to determining that a number of corrections for the location of the map data satisfies a threshold. The system may determine that the first correction satisfies a manual review condition; and generate a notification indicating the first correction upon determining that the first correction satisfies the manual review condition.

The first correction may be generated based on an output of an artificial intelligence model executed by the first autonomous vehicle. The system may modify the map data by performing operations comprising replacing a corresponding feature of the map data with the modified feature. The system may identify a set of modified features each corresponding to a respective location of the map data; and rank each feature of the set of modified features based on a deviation between the feature and a corresponding feature of the map data. The system may update the map data based on the ranking of each feature of the set of modified features.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Figure 1:
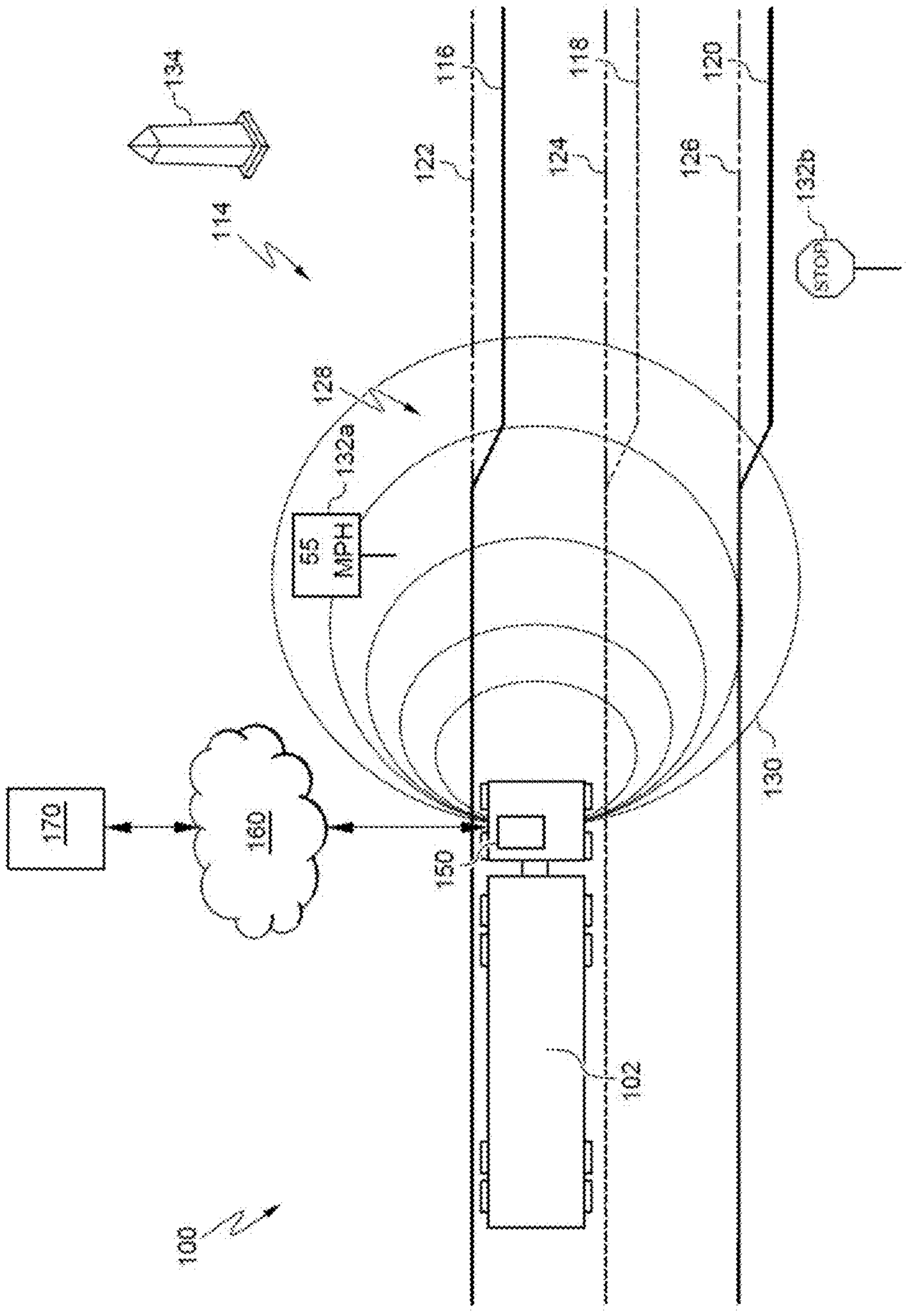
FIG. 1 is a bird's eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of truck 102 may be completely autonomous (fully autonomous), such as self-driving, driverless, or Level 4 autonomy, or semi-autonomous, such as Level 3 autonomy. As used herein the term "autonomous" includes both fully autonomous and semi-autonomous. The present disclosure sometimes refers to autonomous vehicles as ego vehicles. The autonomy system 150 may be structured on at least three aspects of technology: (1) perception, (2) localization, and (3) planning/control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, signs, etc.) and features of the road (e.g., lane lines, shoulder lines, geometries of road features, lane types, etc.) around truck 102, and classify the objects in the road distinctly.

The localization aspect of the autonomy system 150 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map. The digital map may be included as part of a world model, which the truck 102 utilizes to navigate. The world model may include the digital map data (which may be updated and distributed via the various servers described herein) and indications of real-time road features identified based on the perception data captured by the sensors of the autonomous vehicle. In some implementations, map data corresponding to the location of the truck 102 may be utilized for navigational purposes. For example, map data corresponding to a predetermined radius around, or a predetermined region in front of the truck 102 may be included in the world model used for navigation. As the truck 102 navigates a road, the world model may be updated to replace previous map data with map data that is proximate to the truck 102.

Once the systems on the truck 102 have determined its location with respect to the digital map features (e.g., location on the roadway, upcoming intersections, road signs, etc.), and the map data has been compared to locally identified road features to identify discrepancies, as described herein, and to update the world model, the truck 102 can plan and execute maneuvers and/or routes with respect to the features of the road. The planning/control aspects of the autonomy system 150 may be configured to make decisions about how the truck 102 should move through the environment to get to its goal or destination. It may consume information from the perception and localization modules to know where it is relative to the surrounding environment and what other objects and traffic actors are doing.

FIG. 1 further illustrates an environment 100 for modifying one or more actions of truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously. In some implementations, the server 170 may be, or may implement any of the structure or functionality of, the remote server 410*a* described in connection with FIG. 4.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous, having varying degrees of autonomy or autonomous functionality. Further, the various sensors described in connection with the truck 102 may positioned, mounted, or otherwise configured to capture sensor data from the environment surrounding any type of vehicle.

Figure 2:
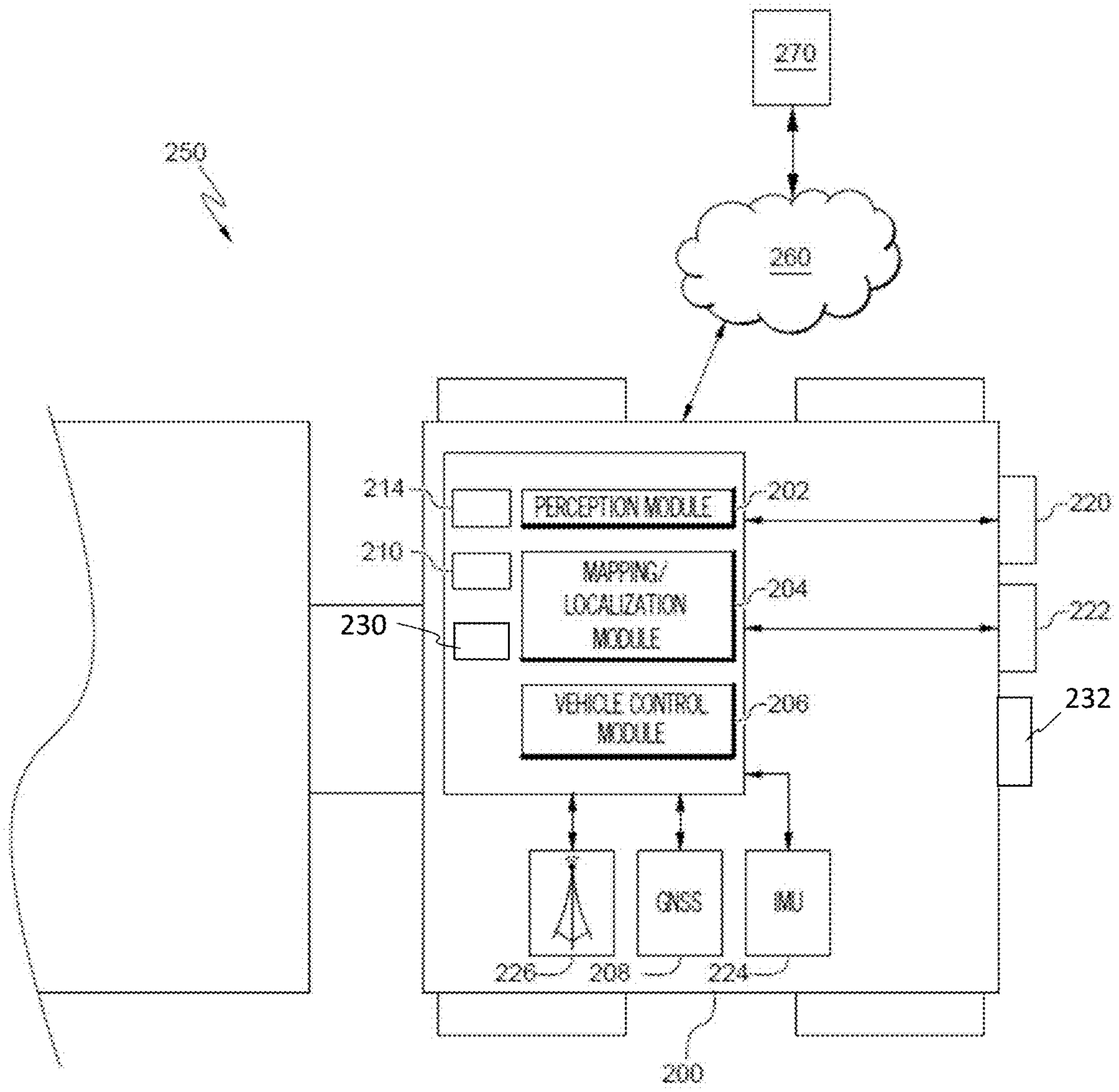
FIG. 2 is a schematic of the autonomy system of the vehicle, according to an embodiment.

With reference to FIG. 2, an autonomy system 250 of a truck 200 (e.g., which may be similar to the truck 102 of FIG. 1) may include a perception system including a camera system 220, a LiDAR system 222, a radar system 232, a GNSS receiver 208, an inertial IMU 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in many ways. As shown in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., ahead of the truck 102) or may surround 360 degrees of the truck 102. In some embodiments, the image data generated by the camera system(s) 220 may be sent to the perception module 202 and stored, for example, in memory 214.

The LiDAR system 222 may include a laser generator and a detector and can send and receive laser rangefinding. The individual laser points can be emitted to and received from any direction such that LiDAR point clouds (or "LiDAR images") of the areas ahead of, to the side, and behind the truck 200 can be captured and stored. In some embodiments, the truck 200 may include multiple LiDAR systems, and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud, and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may estimate strength or effective mass of an object, as objects made of paper or plastic may be weakly detected. The radar system 232 may be based on 24 GHZ, 77 GHz, or other frequency radio waves. The radar system 232 may include short-range radar (SRR), mid-range radar (MRR), or long-range radar (LRR). One or more sensors may emit radio waves, and a processor can process the received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., global positioning system (GPS), etc.) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, an acceleration, an angular rate, and/or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204, to help determine a real-time location of the truck 200 and predict a location of the truck 200 even when the GNSS receiver 208 cannot receive satellite signals.

The transceiver 226 may be configured to communicate with one or more external networks 260 via, for example, a wired or wireless connection to send and receive information (e.g., to a remote server 270). The wireless connection may be a wireless communication signal (e.g., Wi-Fi, cellular, LTE, 5G, etc.) In some embodiments, the transceiver 226 may be configured to communicate with external network(s) 260 via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260, and updates which would otherwise be sent from the network 260 to the truck 200 may be stored at the network 260 until such time as the network connection is restored. In some embodiments, the truck 200 may deploy with all the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences between the perceived environment and the features on a digital map, the truck 200 may provide updates to the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck 200. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remotely from the system 250. For example, one or more features of the mapping/localization module 204 could be located remotely from the truck 200. Various other known circuits may be associated with the autonomy system 250, including signal-conditioning circuitry, communication circuitry, actuation circuitry, and other appropriate circuitry.

Figure 3:
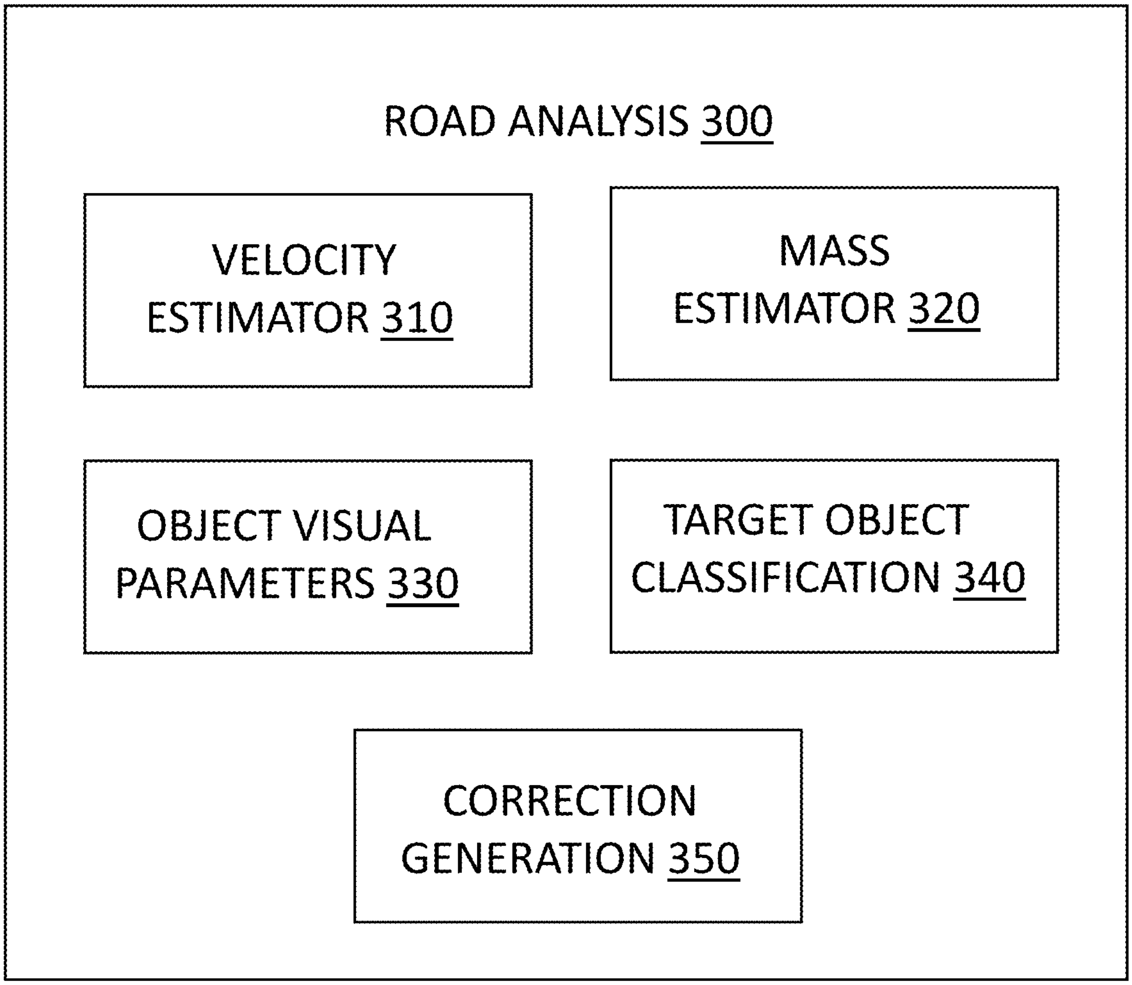
FIG. 3 is a schematic diagram of a road analysis module of the autonomy system of an autonomous vehicle, according to an embodiment.
Figure 4:
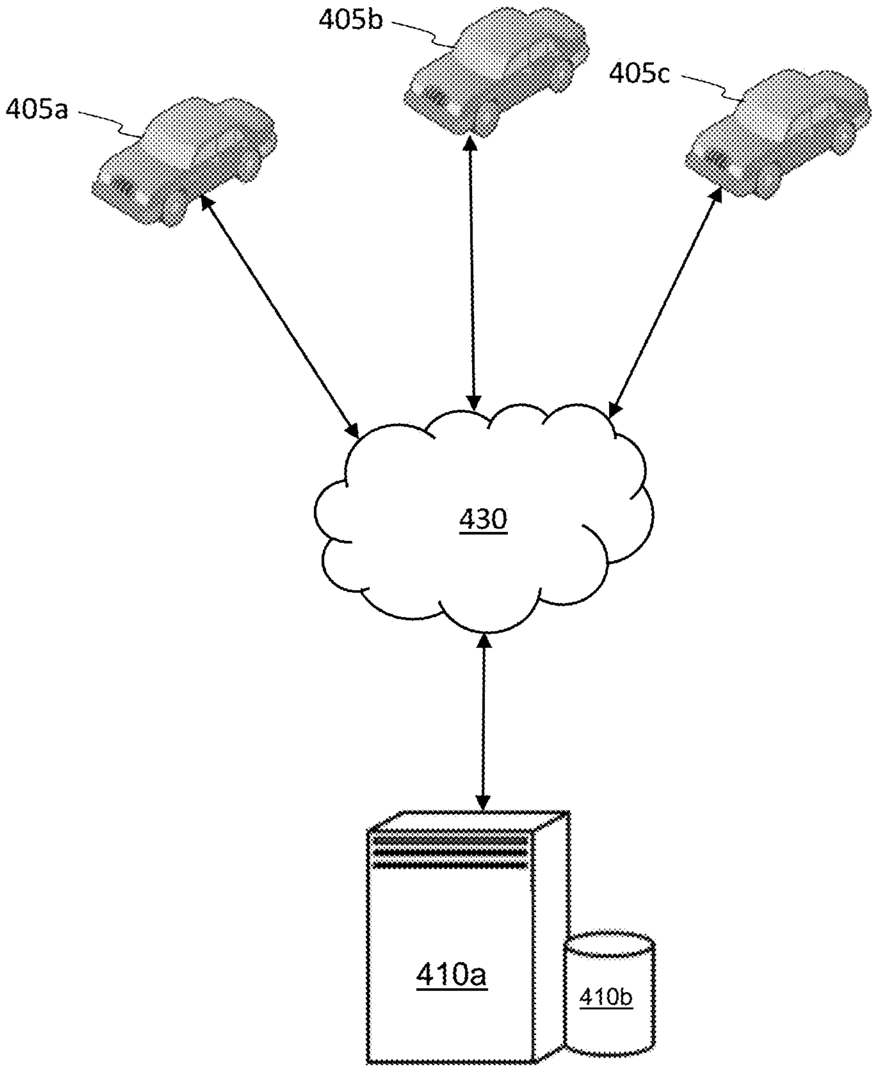
FIG. 4 is a schematic of a system for correcting map data based on sensor data captured by autonomous vehicles, according to an embodiment.
Figure 5:
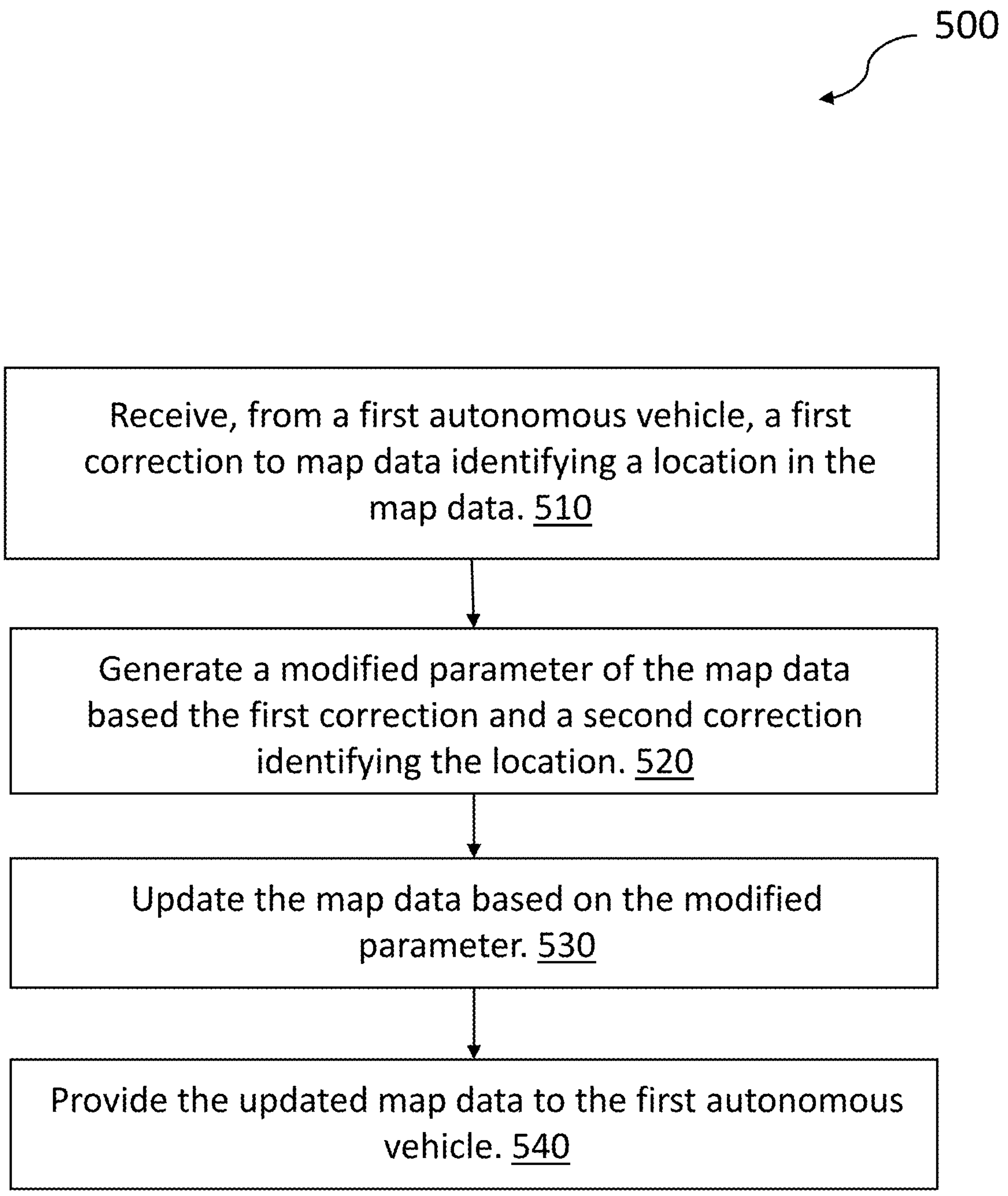
FIG. 5 is a data flow diagram showing processes for correcting map data based on sensor data captured by from autonomous vehicles, according to an embodiment.

The memory 214 of autonomy system 250 may store data and/or software routines that may assist the autonomy system 250 in performing its functions, such as the functions of the perception module 202, the mapping/localization module 204, the vehicle control module 206, a road analysis module 300 of FIG. 3, the functions of the autonomous vehicle(s) 405*a-c* of FIG. 4, and the method 500 of FIG. 5. The memory 214 may store one or more of any data described herein relating to digital maps, world models, perception data or data generated therefrom, including any corrections or errors identified in the digital maps, which may be generated based on data (e.g., sensor data) captured via various components of the autonomous vehicle (e.g., the perception module 202, the mapping/localization module 204, the vehicle control module 206, the processor 210, etc.). Further, the memory 214 may also store data received from various inputs associated with the autonomy system 250, such as perception data from the perception system.

As noted above, perception module 202 may receive input from the various sensors, such as camera system 220, LiDAR system 222, GNSS receiver 208, and/or IMU 224, (collectively "perception data") to sense an environment surrounding the truck and interpret it. To interpret the surrounding environment, the perception module 202 (or "perception engine") may identify and classify objects or groups of objects in the environment. For example, the truck 200 may use the perception module 202 to identify one or more objects (e.g., pedestrians, vehicles, debris, road signs, etc.) or features of the roadway 114 (e.g., intersections, lane lines, shoulder lines, geometries of road features, lane types, etc.) before or beside a vehicle and classify the objects in the road. In some embodiments, the perception module 202 may include an image classification function and/or a computer vision function.

The system 150 may collect perception data. The perception data may represent the perceived environment surrounding the vehicle and may be collected using aspects of the perception system described herein. The perception data can come from, for example, one or more of the LiDAR systems 222, the camera system 220, and various other externally facing sensors and systems on board the vehicle (e.g., the GNSS receiver 208, etc.). For example, on vehicles having a sonar or radar system, the sonar and/or radar systems may collect perception data. As the truck 102 travels along the roadway 114, the system 150 may continually receive data from the various systems on the truck 102. In some embodiments, the system 150 may receive data periodically and/or continuously.

With respect to FIG. 1, the truck 102 may collect perception data that indicates a presence of the lane lines 116, 118, 120. The perception data may indicate the presence of a line defining a shoulder of the road. Features perceived by the vehicle should track with one or more features stored in a digital map (e.g., in the mapping/localization module 204) of a world model, as described herein. Indeed, with respect to FIG. 1, the lane lines that are detected before the truck 102 is capable of detecting the bend 128 in the road (that is, the lane lines that are detected and correlated with a known, mapped feature) will generally match with features in the stored map of the world model and the vehicle will continue to operate in a normal fashion (e.g., driving forward in the left lane of the roadway or per other local road rules). However, in the depicted scenario, the vehicle approaches a new bend 128 in the road that is not stored in the world model (or inconsistent with the map data of the world model) because the lane lines 116, 118, 120 have shifted right from their original positions 122, 124, 126. In this example, absence of the new bend 128 in the digital map data is a geometric inconsistency or error in the digital map data.

The system 150 may compare the collected perception data with the stored digital map data to identify errors (e.g., geometric errors or semantic errors) in the stored map data. The example above, in which lanes lines have shifted from an expected geometry to a new geometry, is an example of a geometric error of the map data. To identify errors in the map data, the system may identify and classify various features detected in the collected perception data from the environment with the features stored in the data of the map data (sometimes referred to herein as a world model), including digital map data representing features proximate to the truck 102. For example, the detection systems may detect the lane lines 116, 118, 120 and may compare the geometry of detected lane lines with a corresponding expected geometry of lane lines stored in the digital map. Additionally, the detection systems could detect the road signs 132*a*, 132*b* and the landmark 134 to compare such features with corresponding semantic features in the digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 150 interacts with the various features. Based on the comparison of the detected features with the features stored in the digital map(s), the system 150 may generate a confidence level, which may represent a confidence of the vehicle in its location with respect to the features on a digital map and hence, its actual location. Additionally, and as described in further detail herein, the system 150 may transmit corrections or errors detected from the digital map to one or more servers, which can correct any inaccuracies or errors detected from the perception data.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters to classify portions, features, or attributes of an image. The image classification function may be embodied by a software module that may be communicatively coupled to a repository of images or image data (e.g., visual data and/or point cloud data) which may be used to detect and classify objects, road features, and/or features in real time image data captured by, for example, the camera system 220 and/or the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. Objects or road features detected via the computer vision function may include, but are not limited to, road signs (e.g., speed limit signs, stop signs, yield signs, informational signs, traffic signals such as traffic lights, signs or signs that direct traffic such as right-only or no-right turn signs, etc.), obstacles, other vehicles, lane lines, lane widths, shoulder locations, shoulder width, or construction-related objects (e.g., cones, construction signs, construction-related obstacles, construction zones, etc.), among others.

The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.). The computer vision function may be embodied by a software module that may be communicatively coupled to a repository of images or image data (e.g., visual data and/or point cloud data), and may additionally implement the functionality of the image classification function.

Mapping/localization module 204 receives perception data that can be compared to one or more digital maps stored in the mapping/localization module 204 to determine where the truck 200 is in the world and/or or where the truck 200 is on the digital map(s), for example, when generating a world model for the environment surrounding the truck 200. In particular, the mapping/localization module 204 may receive perception data from the perception module 202 and/or from the various sensors sensing the environment surrounding the truck 200 and may correlate features of the sensed environment with details (e.g., digital representations of the features of the sensed environment) on the digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connecting to an external network during the mission.

A centralized mapping system may be accessible via network 260 for updating the digital map(s) of the mapping/localization module 204, which may be performed, for example, based on corrections to the world model generated according to the techniques described herein. The digital map may be built through repeated observations of the operating environment using the truck 200 and/or trucks or other vehicles with similar functionality. For instance, the truck 200, a specialized mapping vehicle, a standard autonomous vehicle, or another vehicle can run a route several times and collect the location of all targeted map features relative to the position of the vehicle conducting the map generation and correlation.

Each truck, specialized mapping vehicle, or other vehicle capturing the features of the roadway can then transmit or otherwise provide the captured perception data indicating the targeted map features to one or more remote servers (e.g., the remote server 410*a* of FIG. 4). The server(s) can process the repeated observations, for example, by averaging the features together, to produce a highly accurate, high-fidelity digital map. This generated digital map can be provided to each vehicle (e.g., from the network 260 to the truck 200) before the vehicle departs on its mission so it can carry it on board and use it within its mapping/localization module 204. Hence, the truck 200 and other vehicles (e.g., a fleet of trucks similar to the truck 200) can generate, maintain (e.g., update), and use their own generated maps when conducting a mission. The locally stored map data may be continuously evaluated against features identified in the perception data captured by the sensors of the vehicles during the missions. Inconsistencies, errors, and/or corrections can be transmitted to the remote servers to update the map data, enabling the servers to provide up-to-date map information to various autonomous vehicles even when characteristics of roads are changed.

The generated digital map may include an assigned confidence score assigned to all or some of the individual digital features representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck 200. For example, once the systems on the truck 200 have determined its location with respect to map features (e.g., intersections, road signs, lane lines, etc.) of the world map, the truck 200 may use the vehicle control module 206 and its associated systems to plan and execute maneuvers and/or routes with respect to the features of the environment identified in the world map. The vehicle control module 206 may make decisions about how the truck 200 will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems; for example, the vehicle control module 206 may control one or more of a vehicle steering system, a propulsion system, and/or a braking system. The propulsion system may be configured to provide powered motion for the truck and may include, for example, an engine/motor, an energy source, a transmission, and wheels/tires. The propulsion system may be coupled to and receive a signal from a throttle system, for example, which may be any combination of mechanisms configured to control the operating speed and acceleration of the engine/motor and, thus, the speed/acceleration of the truck. The steering system may be any combination of mechanisms configured to adjust the heading or direction of the truck. The brake system may be, for example, any combination of mechanisms configured to decelerate the truck (e.g., friction braking system, regenerative braking system, etc.). The vehicle control module 206 may be configured to avoid obstacles in the environment surrounding the truck and use one or more system inputs to identify, evaluate, and modify a vehicle trajectory. The vehicle control module 206 is depicted as a single module but can be any combination of software agents and/or hardware modules capable of generating vehicle control signals operative to monitor systems and controlling various vehicle actuators. The vehicle control module 206 may include a steering controller for vehicle lateral motion control and a propulsion and braking controller for vehicle longitudinal motion.

In disclosed embodiments of a system for generating corrections for map data used in autonomous vehicle navigation, the system 150, 250 collects perception data on objects corresponding to the road upon which the truck 200 is traveling, may be traveling in the future (e.g., another road in an intersection), or an adjacent road or lane to which the truck 200 is traveling. Such objects are sometimes referred to herein as target objects. Perception data may also be collected for various road features, including road features relating to the geometry of a road, a shoulder, or one or more lanes of the road, as well as road features indicating a type of road or a condition of a road upon which the truck 200 is traveling or may travel. Collected perception data on target objects and road features may be used to detect one or more errors in the map data stored locally by the components of the truck 200, as described herein, including semantic and geometric errors.

In an embodiment, road analysis module 230 executes one or more artificial intelligence models to predict one or more road features or one or more attributes of detected target objects. The artificial intelligence model(s) may be configured to ingest data from at least one sensor of the autonomous vehicle and predict the attributes of the object. In an embodiment, the artificial intelligence module is configured to predict a plurality of predetermined attributes of each of one or more target objects relative to the autonomous vehicle. The predetermined attributes may include a relative velocity of the respective target object relative to the autonomous vehicle and an effective mass attribute of the respective target object.

In an embodiment, the artificial intelligence model is a predictive machine learning model that may be continuously trained using updated data, e.g., relative velocity data, mass attribute data, target object classification data, and road feature data. In various embodiments, the artificial intelligence model(s) may be predictive machine learning models that are trained to determine or otherwise generate predictions relating to road geometry. For example, the artificial intelligence model(s) may be trained to output predictions of lane width, relative lane position within the road, the number of lanes in the road, whether the lanes or road bend and to what degree the lanes or road bend, to predict the presence of intersections in the road, or to predict the characteristics of the shoulder of the road (e.g., presence, width, location, distance from lanes or vehicle, etc.). In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

FIG. 3 shows a road analysis module 300 of system 150, 250. The road condition analysis module 300 includes velocity estimator 310, effective mass estimator 320, object visual parameters component 330, target object classification component 340, and the correction generation component 350. These components of road analysis module 300 may be either or both software-based components and hardware-based components.

Velocity estimator 310 may determine the relative velocity of target objects relative to the ego vehicle. Effective mass estimator 320 may estimate effective mass of target objects, for example, based on object visual parameters signals from object visual parameters component 330 and object classification signals from target object classification component 340. Object visual parameters component 330 may determine visual parameters of a target object such as size, shape, visual cues, and other visual features in response to visual sensor signals and generate an object visual parameters signal. Target object classification component 340 may determine a classification of a target object using information contained within the object visual parameters signal, which may be correlated to various objects and generate an object classification signal. For instance, the target object classification component 340 can determine whether the target object is a plastic traffic cone, an animal, a road sign, or another type of traffic-related or road-related feature.

Target objects may include moving objects, such as other vehicles, pedestrians, and cyclists in the proximal driving area. Target objects may include fixed objects such as obstacles; infrastructure objects such as rigid poles, guardrails, or other traffic barriers; and parked cars. Fixed objects, also herein referred to herein as static objects and non-moving objects, can be infrastructure objects as well as temporarily static objects such as parked cars. Systems and methods herein may aim to choose a collision path that may involve a nearby inanimate object. The systems and methods aim to avoid a vulnerable pedestrian, bicyclist, motorcycle, or other targets involving people or animate beings, and this avoidance is a priority over a collision with an inanimate object.

The target object classification component 340 can determine additional characteristics of the road, including but not limited to characteristics of signs (e.g., speed limit signs, stop signs, yield signs, informational signs, signs or signs that direct traffic such as right-only or no-right turn signs, etc.), traffic signals such as traffic lights, as well as geometric information relating to the road. The target object classification component 340 can execute artificial intelligence models, for example, which receive sensor data (e.g., perception data as described herein, pre-processed sensor data, etc.) as input and generate corresponding outputs relating to the characteristics of the road or target objects. For example, the artificial intelligence model(s) may generate lane width information, lane line location information, predicted geometries of lane lines, a number of lanes in a road, a location or presence of a shoulder of the road, or a road type (e.g., gravel, paved, grass, dirt/grass, etc.) or a roadway type (e.g., highway, city road, double-yellow road, etc.).

Externally facing sensors may provide system 150, 250 with data defining distances between the ego vehicle and target objects or road features in the vicinity of the ego vehicle and with data defining direction of target objects from the ego vehicle. Such distances can be defined as distances from sensors, or sensors can process the data to generate distances from the center of mass or other portion of the ego vehicle. The externally facing sensors may provide system 150, 250 with data relating to lanes of a multi-lane roadway upon which the ego vehicle is operating. The lane information can include indications of target objects (e.g., other vehicles, obstacles, etc.) within lanes, lane geometry (e.g., number of lanes, whether lanes are narrowing or ending, whether the roadway is expanding into additional lanes, etc.), or information relating to objects adjacent to the lanes of the roadway (e.g., an object or vehicle on the shoulder, on on-ramps or off-ramps, etc.). Upon detection of an inconsistency or error between the captured sensor data and locally stored map data, such information may be transmitted by the system 150, 250 to one or more remote servers to correct map data, as described herein.

In an embodiment, the system 150, 250 collects data relating to target objects or road features within a predetermined region of interest (ROI) in proximity to the ego vehicle. Objects within the ROI may satisfy predetermined criteria for distance from the ego vehicle. The ROI may be a region for which the world map is generated in updated, in some implementations. The ROI may be defined with reference to parameters of the vehicle control module 206 in planning and executing maneuvers and/or routes with respect to the features of the environment. In an embodiment, there may be more than one ROI in different states of the system 150, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, making swerve maneuvers, or other maneuvers or routes of the ego vehicle. For example, the ROI may include other lanes travelling in the same direction, lanes of opposing traffic, edges of a roadway, road junctions, and other road locations in collision proximity to the ego vehicle.

In an embodiment, the system 150, 250 can generate a high-definition (HD) map, at least portions of which may be incorporated into a world model used by the autonomous vehicle to navigate. The system 150, 250 may generate an HD map by utilizing various data sources and advanced algorithms. The data sources may include information from onboard sensors, such as cameras, LiDAR, and radar, as well as data from external sources, such as satellite imagery and information from other vehicles. The system 150, 250 may collect and process the data from these various sources to create a high-precision representation of the road network. The system 150, 250 may use computer vision techniques, such as structure from motion, to process the data from onboard sensors and create a 3D model of the environment. This model may then be combined with the data from external sources to create a comprehensive view of the road network.

The system 150, 250 may also apply advanced algorithms to the data, such as machine learning and probabilistic methods, to improve the detail of the road network map. The algorithms may identify features, such as lane markings, road signs, traffic lights, and other landmarks, and label them accordingly. The resulting map may then be stored in a format that can be easily accessed and used by the autonomous vehicle. The system 150, 250 may use real-time updates from the vehicle's onboard sensors to continuously update the HD map data as the vehicle moves, as described herein. This enables the vehicle to maintain an up-to-date representation of its surroundings in the world model and respond to changing conditions in real-time or near real-time.

The correction generation component 350 can compare the processed sensor data (e.g., road features, including detected geometric features and detected semantic features) to the locally stored map data to determine whether any inconsistencies exist. For example, when navigating, the perception data captured by the sensors may be utilized to generate a world model, which can provide a detailed, up-to-date representation of the road upon which the vehicle is traveling. The vehicle can use the world model to navigate and make real-time decisions. Using the methods and systems discussed herein, the correction generation component 350 can identify consistencies between the locally stored map data and detected road features to provide corrections to one or more remote servers. The remote servers can then aggregate corrections received from several autonomous vehicles to generate an update, and incorporate temporal features into the world model using various data (e.g., from identified road signs, target objects, road features, or received from a server).

For example, the correction generation component 350, can transmit semantic or geometric corrections to one or more external servers to update map data for the area in which the autonomous vehicle is traveling. The servers can utilize the corrections to update remotely stored maps, which may subsequently be transmitted to other autonomous vehicles to provide for efficient navigation of the areas to which corrections were applied. In some implementations, the correction generation component 350 can iteratively access and identify corrections to the digital map data to include various static and temporal features, such as indications of construction zones, closed roads, or other aspects of the road that may be temporal in nature (e.g., may change over time). In some implementations, one or more graphical representations of the digital map data, including any indications of corrections, may be presented to an operator of the autonomous vehicle (e.g., via a display device of the autonomous vehicle, etc.).

The correction generation component 350 can access map data to identify inconsistencies or errors in the map data. As described herein, the map data may be HD map data, which may be generated or updated by one or more remote servers based on sensor data from several autonomous or mapping vehicles that traverse a road. The map data updated by the servers may be transmitted or otherwise provided to one or more autonomous vehicles (in some implementations, including the autonomous vehicle(s) that provided the corrections). To identify errors in the map data, the correction generation component 350 can access map data corresponding to a location (e.g., a GPS location, etc.) of the autonomous vehicle. Using the perception data captured by the various sensors described herein, the correction generation component 350 can identify semantic errors and geometric errors in the map data, which may be provided to one or more remote servers.

Semantic errors may include but are not limited to an incorrect speed limit for a road, an incorrect or misidentified road type of a road, an incorrect or misidentified lane type of a road, an incorrect or misidentified number of lanes in the road, or an incorrect or misidentified road type of a road. Information such as speed limits, road types, lane types, or numbers of lanes for a portion of a road can be included in the world model and utilized by one or more components of the autonomous vehicle for navigation. The correction generation component 350 can identify a semantic error by comparing detected semantic attributes of the road upon which the vehicle is traveling to corresponding semantic attributes identified for that road in the world model. Upon detecting a mismatch, the correction generation component 350 can generate a correction, or modification, to the world model, which may be applied as a direct correction or modification to the world model data or may be provided to downstream processing components with the uncorrected world model, to be utilized when performing navigational or other autonomous tasks.

Similar techniques may be performed to detect geometric errors in the world model. Geometric errors may include but are not limited to errors in expected geometry of lane lines (e.g., lane line location, lane line width, lane line pattern, lane line shape/path), errors in expected geometry of a shoulder of the road (e.g., shoulder presence, shoulder location, shoulder width, whether the shoulder narrows/widens, etc.), errors in expected geometry of intersections (e.g., number of intersecting roads, geometry of pathways through the intersection, etc.) or errors in expected geometry the road (e.g., road width, road shape such as curves, straightaways, whether the road narrows/widens, etc.). The correction generation component 350 can identify a geometric error by comparing detected geometric attributes of the road upon which the vehicle is traveling to corresponding geometric attributes identified for that road in the world model.

As described in further detail in connection with FIG. 4, the errors or inconsistencies in the map data detected by the correction generation component 350 may be transmitted to one or more remote servers, which can aggregate the corrections from multiple vehicles to generate corrected map data. The errors or inconsistencies may be transmitted with a confidence value that indicates a confidence that the detected road feature is present in the perception data captured by the sensors of the autonomous vehicle. The confidence value may be generated by the artificial intelligence model(s) that detect the various road features in the perception data. In some implementations, an error or inconsistency may be transmitted if the detected error or inconsistency is associated with a confidence value that satisfies a predetermined threshold. The errors or inconsistencies may be transmitted via one or more wireless networks (e.g., a cellular communications network, a Wi-Fi network, etc.), or via one or more wired networks (e.g., via a wired connection at a charging or servicing station, etc.). The errors or inconsistencies may be transmitted in real-time or near real-time (e.g., as they are detected) or in a batch process or at predetermined intervals (e.g., once every hour, two hours, once returning to a base station, charging station, or another predetermined location, etc.).

FIG. 4 illustrates components a system 400 for automatic correction of map data for autonomous vehicle navigation, according to an embodiment. The system 400 may include a remote server 410*a*, system database 410*b*, and autonomous vehicles 405*a-d* (collectively or individually the autonomous vehicle(s) 405). In some embodiments, the system 400 may include one or more administrative computing devices that may be utilized to communicate with and configure various settings, parameters, or controls of the system 100. Various components depicted in FIG. 4 may be implemented to receive and process corrections (e.g., indications of errors or inconsistencies in locally stored map data) provided by the autonomous vehicles 405 to generate updated, corrected map data, which can subsequently be deployed to the autonomous vehicles 405 to assist with autonomous navigation processes.

The above-mentioned components may be connected to each other through a network 430. Examples of the network 430 may include, but are not limited to, private or public local-area-networks (LAN), wireless LAN (WLAN) networks, metropolitan area networks (MAN), wide-area networks (WAN), cellular communication networks, and the Internet. The network 430 may include wired and/or wireless communications according to one or more standards and/or via one or more transport mediums. The system 400 is not confined to the components described herein and may include additional or other components, not shown for brevity, which are to be considered within the scope of the embodiments described herein.

The communication over the network 430 may be performed in accordance with various communication protocols such as Transmission Control Protocol and Internet Protocol (TCP/IP), User Datagram Protocol (UDP), and IEEE communication protocols. In one example, the network 430 may include wireless communications according to Bluetooth specification sets or another standard or proprietary wireless communication protocol. In another example, the network 430 may also include communications over a cellular network, including, e.g., a GSM (Global System for Mobile Communications), CDMA (Code Division Multiple Access), EDGE (Enhanced Data for Global Evolution) network.

The autonomous vehicles 405 may be similar to, and include any of the structure and functionality of, the autonomous truck 102 of FIG. 1. The autonomous vehicles 405 may include one or more sensors, communication interfaces or devices, and autonomy systems (e.g., the autonomy system 150 or the autonomy system 250, etc.). The autonomous vehicles 405 may execute various software components, such as the road analysis module 300 of FIG. 3. As described herein, the autonomous vehicles 405 may include various sensors, including but not limited to LiDAR sensors, cameras (e.g., red-green-blue (RGB) cameras, infrared cameras, three-dimensional (3D) cameras, etc.), and IMUs, among others. The sensors of the autonomous vehicles 405 may be processed using various artificial intelligence model(s) executed by the autonomous vehicles to generate semantic and geometric road features, as described in connection with FIGS. 1-3.

Each autonomous vehicle 405 can process and compare the detected road features with corresponding sensor data and any data generated or processed by the autonomy system of the autonomous vehicle 405 to the remote server 410*a*. The autonomous vehicles 405 may transmit the information as the autonomous vehicle 405 operates, or after the autonomous vehicle 405 has ceased operation (e.g., parked, connected to a predetermined wireless or wired network, etc.). In some implementations, the autonomous vehicles 405 may transmit data to the remote server 410*a* in response to one or more requests (e.g. requests for corrections or inconsistencies) transmitted from the remote server 410*a*. The data (e.g., corrections or inconsistencies) transmitted to the remote server 410*a* may include any information relating to the corrections or inconsistencies, including the sensor data itself, the time the data was captured, identifiers of any objects or road features indicated in the discrepancy in the map data, a location of the autonomous vehicle, an indication of the portion of the map data that is potentially incorrect, and confidence value(s) corresponding to the detection of the errors in the map data, among others.

The remote server 410*a* can store map data for the autonomous vehicles 405 in the system database 410*b*. The map data stored in the system database 410*b* can be updated by the remote server 410*a* according to the techniques described herein. The map data may be a pre-generated or pre-established digital map with both geometric and semantic features. Geometric features can indicate the geometry, pathways, and layouts of roads, intersections, lanes, shoulders, or other road features. Semantic features can indicate various attributes of roads, including road type, lane type (e.g., left-only lane, straight only lane, right-only lane, etc.), whether lanes are subject to traffic signs or rules (e.g., stop, yield, slow down, etc.), speed limits for roads and/or lanes, or other road conditions. The map information may be stored in a machine-readable format, such as a sparse vector representation. In some implementations, the map data stored in the system database 410*b* may include temporal or temporary map features, such as indications of construction sites, indications of accidents on roads, indications of traffic congestion, or other temporary road conditions.

The remote server 410*a* can access the system database 410*b* to access the map data and distribute the map data to the autonomous vehicles 405 for local storage and autonomous navigation. In some implementations, the autonomous vehicles 405 may connect and receive map data from to the remote server 410*a* periodically or upon arriving at particular locations or connecting to particular networks, stations, or computing devices. The remote server 410*a* may transmit the map data wirelessly via the network 430. In some implementations, the autonomous vehicles 405 may receive the map data via one or more cellular data networks (e.g., 4G, 5G). In some implementations, the remote server 410*a* may stream one or more portions of the map data to the autonomous vehicles in real-time or near real-time, or in response to a request.

In some implementations, the remote server 410*a* can provide the map data to the autonomous vehicles 405 automatically in response to a request, or as an over-the-air update. The remote server 410*a* may also provide the map data via a hybrid approach, where the remote server 410*a* streams batches of map data relatively local to an autonomous vehicle 405 when connection quality is good, which is then stored locally at the autonomous vehicle 405 for use when the connection between the autonomous vehicle 405 and the remote server 410*a* becomes poor or non-existent. Once the map data has been received, the autonomous vehicles 405 can access and utilize the map data for navigation and generate corrections or indications of errors for transmission to the remote server 410*a* as described herein.

The remote server 410*a* may receive the corrections, inconsistencies, or indicated errors in the map data from the autonomous vehicles 405, and utilize the data to generate updated, corrected map data. To do so, the remote server 410*a* may receive the indications of geometric or semantic corrections, and aggregate said corrections from several autonomous vehicles 405. Aggregating the corrections from multiple autonomous vehicles 405 can include combining the corrections. In such implementations, when multiple corrections to a similar geometric feature of a road are received from multiple autonomous vehicles 405 that traveled on that road, the remote server 410*a* may combine the duplicate or similar corrections by averaging data in each correction. For example, if a number of indications of a change in a position of lane line are received for a stretch of a roadway, the remote server 410*a* can average the received positions of the lane line to determine a corrected position of the lane line. Similar approaches may be utilized for other types of features of the roadway.

In some implementations, the remote server 410*a* can rank different corrections according to a priority assigned to the correction. For example, corrections that indicate a change in a traffic rule for a roadway may be ranked higher than minor geometric corrections. Furthering this example, a correction that indicates a yield sign has changed to a stop sign can be ranked higher than a correction that indicates the width of a shoulder of the road has changed. The remote server 410*a* can assign ranks according to the type and severity of the deviation from the map data. Types of corrections may include corrections that address regulations or safety (e.g., speed limits, changes in signage, etc.), geometric corrections such as changes in the number, type, or position of lanes in a road, or other geometric or semantic corrections described herein. The severity of the correction may be determined based on the type of correction. In one example, the severity of a change in a speed limit may be determined based on the difference between the speed in the map data and the detected speed on the road (e.g., indicated in the correction received from one or more autonomous vehicles 405). If the difference is large, the remote server 410*a* may assign a higher rank to the speed limit change than other corrections.

In some implementations, the remote server 410*a* may correct a provided error in the map data if a predetermined number of errors are received. This can prevent the remote server 410*a* from modifying the map data, for example, if only a single autonomous vehicle provides an indication of an error (e.g., to avoid modifying the map data due to misdetections or anomalies in sensors). To do so, the remote server 410*a* can maintain a counter for a number of corrections to a particular feature of the map data. For example, the remote server 410*a* can receive a correction (e.g., an indication of an error in the map data and a corrected value) for a posted speed limit on a road. If multiple vehicles (e.g., greater than a threshold number) report the error in the map data, the remote server 410*a* can have a higher confidence that the corrected map data was not due to a misdetection, and is instead because the speed limit of the road is changed. As such, in some implementations, the remote server 410*a* may correct errors in a feature of a road only when a predetermined number (e.g., a threshold number) of corrections have been received for that feature of the road.

The remote server 410*a* can generate corrected map data based on the corrections received from the autonomous vehicles 405. In some implementations, the remote server 405 can apply corrections in a batch process, for example, by gathering corrections for a predetermined period of time, performing aggregations on those corrections, and then applying all corrections in a batch to the map data stored in the system database 410*b* to generate the corrected map data. In some implementations, the remote server 410*a* can generate the corrected map data as corrections are received, for example, in an order of priority (e.g., rank) assigned to the corrections (or errors). For example, as soon as a number of corrections for a feature of a road satisfies the threshold, the remote server 410*a* may update the map data. In an example where the remote server 410*a* updates the map data based on rank or priority assigned to the corrections or errors, the remote server 410*a* may update the map data to correct more highly ranked corrections or errors more quickly than other, lower ranked corrections or errors.

In some implementations, the remote server 410*a* can update a feature in the map data with high priority corrections once the threshold number (e.g., which may be dynamically determined based on the type of feature or correction) of corrections has been reached, while other lower priority corrections to map data can be made in slower, batch processing. To apply a correction to the map data, the remote server 410*a* can modify the map information in the system database 410*b* to replace incorrect data relating to a feature with the corresponding aggregated semantic correction(s) and geometric correction(s) received from the autonomous vehicles 405. For example, if an average value has been calculated for a change in a lane line position of a road, the remote server 410*a* can replace the existing lane line position for the road in the map data with the calculated average value for the lane line position. Similar techniques can be utilized to update semantic corrections, such as changes to lane types, road signs, speed limits, or other semantic features of the road.

In some implementations, the remote server 410*a* may apply corrections only if the aggregated value for the correction is a threshold deviation from the corresponding value in the map data. Furthering the lane line example above, the remote server 410*a* may replace the lane line in the map data with the aggregate value if the difference between the lane line position in the map data and the aggregate lane line position calculated from the corrections received from the autonomous vehicles 405 satisfies a threshold. The threshold for different corrections may be assigned based on the type of correction and the relevance of the road feature for safety and navigation.

Once the updated map data has been generated and stored in the system database 410*b*, the remote server 410*a* can transmit the updated map information to the autonomous vehicles 405. In some implementations, the remote server 410*a* can provide the updates to the map data to the autonomous vehicles 405, for example, in a "patch" which the autonomous vehicle 405 can utilize to update the map data stored in its local storage. In some implementations, the updated map data can be provided in its entirety in response to a request, in response to the autonomous vehicles accessing a station, hub, or charging port, or in response to the autonomous vehicle 405 being at a predetermined location or having a signal strength (e.g., a cellular or wireless connectivity strength) that satisfies a threshold. The update map data may be provided in batch, or based on when autonomous vehicles travel to particular locations. For example, if an autonomous vehicle 405 is assigned a mission to travel a particular route, the remote server 410*a* can provide the updated map data for that route.

Although the foregoing has been described with reference to a singular remote server 410*a*, it should be understood that this is for example purposes only, and that any number of servers, computing devices, or any type of distributed computing environment such as a cloud computing environment, may perform the techniques described herein. Similarly, although the system database 410*b* has been shown and described as a singular element in proximity to the remote server 410*a*, the system database 410*b* may be any type of data storage device, including distributed or cloud-based storage systems, that are capable of maintaining the map data described herein.

FIG. 5 is a flow diagram of an example method 500 of correcting map data based on sensor data captured by from autonomous vehicles, according to an embodiment. The steps of the method 500 of FIG. 5 may be executed, for example, by an autonomous vehicle system, including the system 150, 250, or the road analysis module 300, according to some embodiments. The method 500 shown in FIG. 5 comprises execution steps 510-540. However, it should be appreciated that other embodiments may comprise additional or alternative execution steps or may omit one or more steps altogether. It should also be appreciated that other embodiments may perform certain execution steps in a different order. Steps discussed herein may also be performed simultaneously or near-simultaneously with one another.

The method 500 of FIG. 5 is described as being performed by a remote server (e.g., the remote server 410*a* of FIG. 4) in communication with one or more autonomous vehicles (e.g., the system 150, the system 250, the road analysis module 300, etc.). However, in some embodiments, one or more of the steps may be performed by different processor(s) or any other computing device. For instance, one or more of the steps may be performed via a cloud-based service or another processor in communication with the processor of the autonomous vehicle and/or its autonomy system. Although the steps are shown in FIG. 5 as having a particular order, it is intended that the steps may be performed in any order. It is also intended that some of these steps may be optional.

At step 510 of the method 500, the remote server can receive, from a first autonomous vehicle (e.g., an autonomous vehicle 405*a*) traveling on a road, a first correction to map data identifying a location in the map data. The first correction may be, for example, any type of correction described herein, including semantic or geometric corrections. The correction may identify a particular feature (sometimes referred to herein as a "parameter") of the map data that is incorrect, and an estimated corrected value for that same parameter. Additional information may also be transmitted with the correction, such as the sensor data used by the first autonomous vehicle to detect the error, the time the sensor data was captured, identifiers of any objects or road features indicated in the discrepancy in the map data, a location of the first autonomous vehicle, an indication of the portion of the map data that is potentially incorrect, and confidence value(s) corresponding to the detection of the errors in the map data, among others.

As described herein, autonomous vehicles can capture sensor data from LiDAR sensors, image sensors, radar sensors, IMU sensors, or other types of sensors while the autonomous vehicle operates. The sensor data can be processed using artificial intelligence models to identify any geometric or semantic properties of the road. For example, the autonomous vehicles can process the sensor data received in step to identify one or more semantic features of the road. Image data captured by cameras may be provided as input to one or more artificial intelligence models that are trained to generate identifications of semantic features as output. The semantic features generated by the artificial intelligence models include but are not limited to a speed limit for a road, a road type of a road, a lane type of a road, or a number of lanes in the road, among others. The artificial intelligence models utilized to detect and classify the semantic features may be previously trained by one or more servers and provided to the autonomous vehicle system for use during operation of the autonomous vehicle.

If a mismatch is detected between the expected semantic features of locally stored map data and the semantic features generated via the artificial intelligence models, a corresponding semantic correction can be generated. The semantic correction may include an indication of the feature of the map data that is incorrect, the correct value detected from the sensor data, location data of the autonomous vehicle, as well as any other correction-related information described herein. In some implementations, the artificial intelligence models may generate a confidence score that indicates a confidence that a detected semantic feature has been detected in the sensor data. In such implementations, the autonomous vehicle may generate a semantic correction if the confidence value for the semantic features satisfies a predetermined threshold. In some implementations, the confidence value may be included as part of the correction.

The autonomous vehicles may also identify any geometric corrections to the map data. The autonomous vehicle may generate geometric corrections by processing image data captured by cameras or LiDAR data captured by LiDAR systems of the autonomous vehicle. As described herein, said data may be provided as input to one or more artificial intelligence models that are trained to generate predicted geometries of the road features. The geometries of the road features predicted or otherwise generated by the artificial intelligence models include but are not limited to the geometry of lane lines (e.g., lane line location, lane line width, lane line pattern, lane line shape/path), the geometry of a shoulder of the road (e.g., shoulder presence, shoulder location, shoulder width, whether the shoulder narrows/widens, etc.), the geometry of intersections (e.g., number of intersecting roads, geometry of pathways through the intersection, etc.) or the geometry the road itself (e.g., road width, road shape such as curves, grade information, straightaways, whether the road narrows/widens, a grade of a road, an elevation of the road, or a surface type of the road etc.). The surface type of the road may include gravel, rock, paved, or other suitable classifications for a road surface.

To detect a geometric error in the locally stored map data, the geometries of the road features generated via the artificial intelligence models can be compared to corresponding expected geometries of corresponding road features identified in the map data. In some implementations, the autonomous vehicle can detect a presence of a geometric error if a difference between an expected geometry for a road feature and the predicted geometry of the road feature generated by the artificial intelligence models satisfies a predetermined threshold. In some implementations, the autonomous vehicle may generate a geometric correction for a road feature if the confidence value for the geometry of the road feature satisfies a predetermined confidence threshold.

The generated corrections (e.g., semantic or geometric corrections) can be transmitted to the remote server to correct remotely stored map data. The corrections may be transmitted via one or more wireless networks (e.g., a cellular communications network, a Wi-Fi network, etc.), or via one or more wired networks (e.g., via a wired connection at a charging or servicing station, etc.). The corrections may be transmitted in real-time or near real-time (e.g., as they are detected) or in a batch process or at predetermined intervals (e.g., once every hour, two hours, once returning to a base station, charging station, or another predetermined location, etc.). The remote server can receive the corrections from any number of autonomous vehicles over a period of time. The remote server can store each of the corrections in memory. In some implementations, a correction may be transmitted to the remote server upon determining that a detected parameter in the sensor data differs from a corresponding locally stored parameter of the map data to a degree greater than a predetermined threshold.

In some implementations, the remote server can determine whether a correction satisfies a manual review condition. The manual review condition can indicate whether the correction (or the feature of the map data indicated as having an error) warrants manual review. In one example, if a correction significantly deviates from what is stored in the map data, but was detected by multiple autonomous vehicles with high confidence, the remote server can determine that the correction should be manually reviewed. In another example, if conflicting corrections are detected with high confidence by different autonomous vehicles dispersed over time, the manual review condition may be satisfied to enable a manual reviewer to select the best correction, if any is needed. Upon determining that a correction warrants manual review, the remote server can generate a notification that indicates the correction satisfies the manual review condition. The notification may include sensor data corresponding to the correction(s), data relating to the map feature, as well as the correction(s) that warrant manual review. The notification may be displayed, for example, in a web-based interface.

At step 520 of the method 500, the remote server can generate a modified feature of the map data based on the first correction and a second correction identifying the location. The second correction can be received from a second autonomous vehicle that traveled on the same road as the first autonomous vehicle. To avoid modifying the map data due to misdetections or anomalies in sensors, the remote server can aggregate data from corrections for a map feature received from multiple autonomous vehicles. Aggregating the corrections from multiple autonomous vehicles can include combining the corrections by performing an average operation on data in each correction. For example, if a number of indications of a change in a position of the shoulder of the road are received for a stretch of a roadway, the remote server can average the received positions of the shoulder to determine a corrected position of the shoulder. Similar approaches may be utilized for other types of features of the map data. In some implementations, a weighted average may be performed using the confidence value of each correction.

In some implementations, the remote server can generate a modified feature for the map data once a predetermined number of corrections for that feature have been received from autonomous vehicles. For example, the remote server can maintain a counter that tracks the number of corrections received for a feature of the map data. When the counter satisfies a threshold value, the remote server can generate the modified feature by aggregating the data of the received corrections, as described herein. The aggregated value is stored as the modified feature for the map data.

At step 530 of the method 500, the remote server can update the map data based on the modified feature. To update the map data, the remote server can replace a corresponding feature of the map data with the modified feature generated in step 520. The remote server can update the map data according to a schedule, such that multiple corrections are applied in a batch process. For example, the remote server may gather corrections for a predetermined period of time, performing aggregations on those corrections, and then apply all outstanding corrections in batch to the map data. In some implementations, the remote server can generate the corrected map data as corrections are received, for example, in an order of priority (e.g., rank) assigned to the corrections (or errors). In an example where the remote server updates the map data based on rank or priority assigned to the corrections or errors, the remote server may update the map data to correct more highly ranked corrections or errors more quickly than other, lower ranked corrections or errors.

The rank assigned to each correction may be based on the location in the map data that is being corrected. For example, certain areas may experience higher density traffic, and it is therefore more important to maintain up-to-date map data for those areas to ensure safe and efficient autonomous vehicle navigation. In some implementations, corrections with values that deviate more severely from the corresponding features in the map data, but still were detected with high confidence values, may be ranked higher than other corrections with relatively low deviations from what is stored in the map data. The remote server can process high priority corrections to update the corresponding features in the map data in real-time or near real-time, while other lower priority corrections to map data can be made in slower, batch processing.

At step 540 of the method 500, the remote server can provide the updated map data to the first autonomous vehicle. Once the map data has been updated based on the corrections, the remote server can transmit the updated map information to one or more autonomous vehicles. The remote server may provide the updated map data to the autonomous vehicles as data which the autonomous vehicle can utilize to update the map data stored in its local storage. For example, the remote server may transmit the changes to the map data relatively to a previous version of the map data to the autonomous vehicles. In some implementations, the updated map data can be provided in its entirety in response to a request, in response to the autonomous vehicles accessing a station, hub, or charging port, or in response to the autonomous vehicle being at a predetermined location or having a signal strength (e.g., a cellular or wireless connectivity strength) that satisfies a threshold. The updated map data may be provided in batch, or based on when autonomous vehicles travel to particular locations.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for correcting map data of an autonomous vehicle, comprising:

receiving, by one or more processors coupled to a non-transitory memory, (i) from a first autonomous vehicle traveling on a road, a first correction to map data identifying a location in the map data, the first correction generated based on first object features detected by a first artificial intelligence model executed at the first autonomous vehicle and a first confidence value output from the first artificial intelligence model, the first confidence value associated with the first features detected by the first artificial intelligence model, the first confidence value satisfying a predetermined threshold, and (ii) from a second autonomous vehicle traveling on the road, a second correction to map data identifying the location in the map data, the second correction generated based on second features detected by a second artificial intelligence model executed at the second autonomous vehicle and a second confidence value output from the second artificial intelligence model, the second confidence value associated with the second features detected by the second artificial intelligence model, the second confidence value satisfying the predetermined threshold;

ranking, by the one or more processors, the first correction and the second correction by:

determining, for the first correction, a first level of deviation severity based on a comparison between first data associated with the first correction and the map data for the first features;

determining, for the second correction, a second level of deviation severity based on a comparison between second data associated with the second correction and the map data for the second features;

assigning a first priority, based on the first confidence value and the determined first level of deviation severity, to the first correction;

assigning a second priority, based on the second confidence value and the determined second level of deviation severity, to the second correction; and generating a rank for the first correction and a rank for the second correction based on a result of a determination of which of the assigned first priority and the assigned second priority has a higher priority;

generating, by the one or more processors, modified features of the map data based on each of the ranked first correction and the ranked second correction;

updating, by the one or more processors, the map data based on the generated modified features in an order of priority corresponding to the respective ranking of the ranked first correction and the ranked second correction; and providing, by the one or more processors, the updated map data to the first autonomous vehicle, wherein an autonomy system of the first autonomous vehicle is configured to control operation of the first autonomous vehicle based on the updated map data.

2. The computer-implemented method of claim 1, wherein the first correction and the second correction each comprise a semantic correction to the map data.

3. The computer-implemented method of claim 1, wherein the first correction and the second correction each comprise a geometric correction to the map data.

4. The computer-implemented method of claim 1, wherein generating the modified features comprises calculating, by the one or more processors, an average of first data of the first correction and second data of the second correction.

5. The computer-implemented method of claim 1, wherein generating the modified features is responsive to determining, by the one or more processors, that a number of corrections for the location of the map data satisfies a threshold.

6. The computer-implemented method of claim 1, further comprising:

determining, by the one or more processors, that the first correction satisfies a manual review condition; and generating, by the one or more processors, a notification indicating the first correction upon determining that the first correction satisfies the manual review condition.

7. The computer-implemented method of claim 1, further comprising:

executing, by the one or more processors, a counter for counting a number of corrections to a feature of the map data; and correcting, based on the number of corrections satisfying a threshold number of corrections, one or more errors in the feature.

8. The computer-implemented method of claim 1, wherein updating the map data comprises replacing, by the one or more processors, corresponding features of the map data with the generated modified features.

9. The computer-implemented method of claim 1, wherein the generated modified features include a plurality of modified features, the computer-implemented method further comprising:

identifying, by the one or more processors, a set of modified features from the plurality of modified features, each modified feature of the set of modified features corresponding to a respective location of the map data; and ranking, by the one or more processors, each modified feature of the set of modified features based on deviation between the respective modified feature and a corresponding existing feature of the map data.

10. The computer-implemented method of claim 9, wherein updating the map data comprises updating the map data based on the ranking of each modified feature of the set of modified features.

11. A system for correcting map data of an autonomous vehicle, comprising:

one or more processors coupled to a non-transitory memory, the one or more processors configured to:

receive, (i) from a first autonomous vehicle traveling on a road, a first correction to map data identifying a location in the map data, the first correction generated based on first features detected by a first artificial intelligence model executed at the first autonomous vehicle and a first confidence value output from the first artificial intelligence model, the first confidence value associated with the first features detected by the first artificial intelligence model, and (ii) from a second autonomous vehicle traveling on the road, a second correction to map data identifying the location in the map data, the second correction generated based on second features detected by a second artificial intelligence model executed at the second autonomous vehicle and a second confidence value output from the second artificial intelligence model, the second confidence value associated with the second features detected by the second artificial intelligence model;

rank the first correction and the second correction by:

determining, for the first correction, a first level of deviation severity based on a comparison between first data associated with the first correction and the map data for the first features;

determining, for the second correction, a second level of deviation severity based on a comparison between second data associated with the second correction and the map data for the second features;

assigning a first priority, based on the first confidence value and the determined first level of deviation severity, to the first correction; and assigning a second priority, based on the second confidence value and the determined second level of deviation severity, to the second correction; and generating a rank for the first correction and a rank for the second correction based on a result of a determination of which of the assigned first priority and the assigned second priority has a is higher priority;

generate modified features of the map data based on each of the ranked first correction and the ranked second correction;

update the map data based on the generated modified features in an order of priority corresponding to the respective ranking of the ranked first correction and the ranked second correction; and provide the updated map data to the first autonomous vehicle, wherein an autonomy system of the first autonomous vehicle is configured to control operation of the first autonomous vehicle based on the updated map data.

12. The system of claim 11, wherein the first correction and the second correction each comprise a semantic correction to the map data.

13. The system of claim 11, wherein the first correction and the second correction each comprise a geometric correction to the map data.

14. The system of claim 11, wherein the one or more processors are further configured to generate the modified features by performing operations comprising calculating an average of first data of the first correction and second data of the second correction.

15. The system of claim 11, wherein the one or more processors are further configured to generate the modified features responsive to determining that a number of corrections for the location of the map data satisfies a threshold.

16. The system of claim 11, wherein the one or more processors are further configured to:

determine that the first correction satisfies a manual review condition; and generate a notification indicating the first correction upon determining that the first correction satisfies the manual review condition.

17. The system of claim 11, wherein the one or more processors are further configured to:

execute a counter for counting a number of corrections to a feature of the map data; and correct, based on the number of corrections satisfying a threshold number of corrections, one or more errors in the feature.

18. The system of claim 11, wherein the one or more processors are further configured to update the map data by performing operations comprising replacing corresponding features of the map data with the generated modified features.

19. The system of claim 11, wherein the generated modified features include a plurality of modified features, and wherein the one or more processors are further configured to:

identify a set of modified features from the plurality of modified features, each modified feature of the set of modified features corresponding to a respective location of the map data; and rank each modified feature of the set of modified features based on deviation between the respective modified feature and a corresponding existing feature of the map data.

20. The system of claim 19, wherein the one or more processors are further configured to update the map data based on the ranking of each modified feature of the set of modified features.

* * * * *